(12) United States Patent
Enderich et al.

(10) Patent No.: US 8,388,713 B2
(45) Date of Patent: Mar. 5, 2013

(54) OIL MIST SEPARATOR

(75) Inventors: Andreas Enderich, Esslingen (DE); Michael Feil, Bayreuth (DE); Wolfgang Früh, Köngen (DE); Ulrich Hütter, Stuttgart (DE); Stefan Ruppel, Heidelberg Emmertsgrund (DE); Hartmut Sauter, Renningen (DE); Yakup Özkaya, Kornwestheim (DE)

(73) Assignee: Mahle International GmbH (DE)

( * ) Notice: Subject to any disclaimer, the term of this patent is extended or adjusted under 35 U.S.C. 154(b) by 165 days.

(21) Appl. No.: 12/809,329

(22) PCT Filed: Dec. 9, 2008

(86) PCT No.: PCT/EP2008/067081
§ 371 (c)(1),
(2), (4) Date: Nov. 1, 2010

(87) PCT Pub. No.: WO2009/080492
PCT Pub. Date: Jul. 2, 2009

(65) Prior Publication Data
US 2011/0036242 A1 Feb. 17, 2011

(30) Foreign Application Priority Data
Dec. 21, 2007 (DE) .......................... 10 2007 062 098

(51) Int. Cl.
*B01D 46/00* (2006.01)
(52) U.S. Cl. ................. 55/313; 55/320; 55/423; 55/428
(58) Field of Classification Search .................... 55/309, 55/416, 418, 462, 465; 95/267; 96/147; 123/572, 573, 574; 73/28.05, 863.22
See application file for complete search history.

(56) References Cited

U.S. PATENT DOCUMENTS
(Continued)

FOREIGN PATENT DOCUMENTS
| CN | 102317585 A | 1/2012 |
|----|-------------|--------|
| DE | 3618557 A1  | 12/1986 |

(Continued)

OTHER PUBLICATIONS

English abstract for JP-2005201080, 2005.

(Continued)

*Primary Examiner* — Duane Smith
*Assistant Examiner* — Minh-Chau Pham
(74) *Attorney, Agent, or Firm* — Rader, Fishman & Grauer PLLC

(57) ABSTRACT

A positive crankcase ventilation oil mist separator system has a first separator unit, wherein the first separator unit includes at least one filter body arranged in a blow-by gas path such that blow by gas flows through the filter body; a second separator unit, wherein the second separator is an impactor separator arranged in a bypass path that bypasses the first separator unit; and a bypass valve, which opens the bypass path as soon as a differential pressure at the first separator unit exceeds a predefined value, wherein the second separator unit comprises an impact wall formed by a section of the filter body of the first separator unit, and a flow directing element which directs the blow-by gas flow against the impact wall when the blow-by gas path is open.

20 Claims, 8 Drawing Sheets

U.S. PATENT DOCUMENTS

| | | | |
|---|---|---|---|
| 4,602,595 | A | 7/1986 | Aoki et al. |
| 5,669,366 | A | 9/1997 | Beach et al. |
| 6,290,738 | B1* | 9/2001 | Holm ............................ 55/309 |
| 6,293,268 | B1* | 9/2001 | Mammarella ................. 123/574 |
| 6,418,918 | B2* | 7/2002 | Mammarella ................. 123/572 |
| 6,505,615 | B2* | 1/2003 | Pietschner ................... 123/572 |
| 6,626,163 | B1* | 9/2003 | Busen et al. ................. 123/572 |
| 6,684,864 | B1* | 2/2004 | Busen et al. ................. 123/572 |
| 6,797,040 | B2* | 9/2004 | Lenzing ........................ 95/267 |
| 7,080,636 | B2* | 7/2006 | Knaus et al. ................. 123/572 |
| 7,238,216 | B2* | 7/2007 | Malgorn et al. .............. 55/418 |
| 7,473,291 | B2* | 1/2009 | Evenstad et al. ............. 55/416 |
| 8,152,884 | B1* | 4/2012 | Severance et al. ........... 55/462 |
| 2007/0256566 | A1* | 11/2007 | Faber et al. .................... 96/417 |
| 2008/0105494 | A1 | 5/2008 | Lemke et al. |
| 2009/0050121 | A1* | 2/2009 | Holzmann et al. ............ 123/573 |
| 2010/0031940 | A1 | 2/2010 | Mosset et al. |
| 2010/0229510 | A1 | 9/2010 | Heinen et al. |

FOREIGN PATENT DOCUMENTS

| | | |
|---|---|---|
| DE | 19729439 A1 | 1/1998 |
| DE | 10232044 A1 | 2/2004 |
| DE | 20302220 U1 | 6/2004 |
| DE | 10359523 A1 | 7/2005 |
| DE | 102005043198 A1 | 3/2006 |
| DE | 102004055065 A1 | 5/2006 |
| DE | 102004061938 B3 | 6/2006 |
| DE | 102005038257 A1 | 2/2007 |
| DE | 102006051143 A1 | 5/2008 |
| EP | 0860589 A1 | 8/1998 |
| JP | 61-159611 A | 7/1986 |
| JP | 2001-336413 A | 12/2001 |
| JP | 2002-242645 A | 8/2002 |
| JP | 2005021080 A | 1/2005 |
| JP | 2009-513877 A | 4/2009 |
| WO | WO-2009025927 A1 | 2/2009 |

OTHER PUBLICATIONS

English abstract for DE-20302220, Jul. 2004.
English abstract for DE-10359523, Jul. 2005.
English abstract for DE-10232044, Feb. 2004.
English abstract for DE-102004055065, May 2006.
English abstract for DE-102004061938, Jun. 2006.
English abstract for JP-61-159611, Oct. 1986.
English translation of JP-2002242645.
European Search Report for corresponding EP application EP-11173619.
English translation of JP 2001-336413.

* cited by examiner

OIL MIST SEPARATOR

CROSS-REFERENCES TO RELATED APPLICATIONS

This application claims priority to German patent applications DE 10 2007 062 098.7 filed on Dec. 21, 2007, and PCT/EP2008/067081 filed on Dec. 9, 2008, both of which are hereby incorporated by reference in their entirety.

TECHNICAL FIELD

The present invention relates to an oil mist separator for a positive crankcase ventilation unit.

BACKGROUND

During the operation of internal combustion engines which, for example, can be arranged in motor vehicles, so-called blow gas gets through a leakage between pistons and cylinders into a crankcase of the respective internal combustion engine. To prevent unacceptable overpressure within the crankcase or to prevent emission of blow-by gas into the environment, positive crankcase ventilation systems are used. Usually, such a positive ventilation system connects the crankcase by means of a vent line with a fresh gas tract of an internal combustion engine. Within the fresh gas tract, in particular downstream of a throttle valve, a relative negative pressure exists which allows that blow-by gas is sucked-in from the crankcase. Further, during the operation of the internal combustion engine, oil mist is generated. Thus, exhausted blow-by gas contains oil mist. To reduce the oil consumption of the internal combustion engine or to reduce the pollutant emission of the internal combustion engine, the positive crankcase ventilation system normally has an oil mist separator that serves for separating the oil mist carried along in the blow-by gas sucked out of the crankcase and to convey it to a suitable oil reservoir which, in particular, can involve an oil pan attached at the bottom of the crankcase.

A progressive tightening of pollutant emission regulations requires an improvement of the cleaning effect of such oil mist separators. Additional, partially conflicting requirements must be met such as, e.g., the longest possible maintenance-free service life of the oil mist separator, a pressure loss as small as possible, a design as compact as possible, and a separation efficiency as high as possible.

From EP 0 860 589 B1, an oil mist separator for a crankcase ventilation system is known which has a first separator unit and a second separator unit as well as a bypass valve. The first separator unit comprises at least one filter body that is arranged in a blow-by gas path in such a manner that blow-by gas can flow through it. The second separator unit is arranged in a bypass path which bypasses the first separator unit and which is opened by the bypass valve as soon as a differential pressure at the first separator unit exceeds a predefined value. In the known oil mist separator, the second separator unit is formed by a filter body.

Further oil mist separators which have a bypass path controlled by means of a bypass valve for bypassing their separator unit, but which do not have an additional separator unit arranged within the bypass path are known from DE 10 2006 051 143 A1, from DE 10 2005 038 257 A1, from DE 2004 061 938 B3, from DE 10 2004 055 065 A1, from DE 103 59 523 A1, from DE 102 32 044 A1, from DE 197 29 439 A1, from WO 01/92 690 A1, and from DE 203 02 220 U1.

SUMMARY

The present invention is concerned with the problem to provide, for an oil mist separator of the above mentioned type, an improved embodiment which is in particular characterized in that it can be manufactured in a comparatively inexpensive manner and preferably has a compact design with a comparatively long maintenance-free service life, and in that it offers an acceptable pressure loss and achieves a relatively high separation efficiency.

This problem is solved according to the invention by the subject matters of the independent claims. Advantageous embodiments are subject matter of the dependant claims.

In the invention, the second separator unit is designed as an impactor separator. This is a special type of an inertial separator that normally works with an impact wall or impact plate against which the blow-by gas flow is directed by means of suitable flow guiding means to achieve a deflection of the flow. While the gas, due to an impulse reversion, simply bounces off the impact plate and flows off in more or less opposite direction, liquid particles adhere to the impact wall, can accumulate thereon and can flow off. With a suitable flow velocity during the impact on the impact plate, such an impactor separator can also achieve advantageous separating efficiencies similar to the ones of a filter body. With such an impactor separator, the risk of backpressure increase caused by gradual clogging does normally not occur. To achieve the desired high separation efficiency, however, the impactor separator needs a comparatively high flow velocity which can normally be achieved by means of a cross-section reduction, in particular by means of a nozzle formation which, however, results in a corresponding backpressure increase. Thus, in case of low differential pressures, such an impactor separator does not work at all or only insufficiently. In contrast thereto, in the oil mist separator according to the invention, the impactor separator, thus the second separator unit is only used when appropriately high differential pressures already exist. In this manner, the embodiment of this oil mist separator combines the advantages of the two different separator principles resulting in an increased overall efficiency of the oil mist separator. While the first separator unit working with the filter body allows for high separation efficiency at a low volume flow of blow-by gases, the second separator unit designed as an impactor separator can achieve high separation efficiency also at high volume flows.

Here, the invention is based on the general idea to equip the oil mist separator with at least two parallelly arranged separator units, one of which has a filter body through which blow-by gas can flow and the second one of which can be activated or connected pressure-dependent by means of a bypass valve. The filter body through which blow-by gas can flow is characterized by very high separation efficiency because it can be readily designed in such a manner that it is permeable for a gas flow, whereas it is quasi impermeable for solid or liquid particles up to very small core diameters which are carried along. In comparison to inertial separators which remove oil droplets and solid particles from the blow-by gas flow only by a flow deflection, such a filter body also collects smaller or lighter oil droplets and solid particles. However, filter bodies have an increased higher flow resistance, at least with respect to simple inertial separators. The through-flow resistance of such a filter body increases with increasing loading of the respective filter material. Separated solid particles are deposited in the filter material. Separated liquid droplets can accumulate first in the filter material and can flow off again from the filter material upon sufficient wetting. Here, it is also possible to a achieve a drop formation on the flow-off side, wherein the drops which are formed flow off or drip off after reaching a certain size. Thus, the through-flow resistance of the filter body can increase during the operation of the oil mist separator. To prevent, at the filter body, an inadmissibly high through-flow resistance which would jeopardize a required blow-by gas suction from the crankcase, the bypass valve is provided which, when a predefined differential pressure at the first separator unit is reached, opens a bypass in which the second separator unit is arranged. Through its arrangement within the bypass, this second separator unit is arranged parallelly to the first separator unit. The activated second separator unit hence works in addition to the first separator unit, wherein the distribution of the blow-by gas between the two separator units depends on the differential pressure applied to the first separator unit. The higher the differential pressure, the higher is the amount of blow-by gas flowing through the bypass path and through the second separator unit.

By means of the second separator unit which is connected in parallel and can be activated pressure-dependent, it can be ensured that even in case of a clogged filter body of the first separator unit, or in general, in case of a high differential pressure applied to the oil mist separator, a sufficient amount of blow-by gas can flow through the oil mist separator. Hence, a blow-by gas quantity required for a functionally reliable ventilation of the crankcase can be sucked off at least in the relevant operational regions of the internal combustion engine.

Particularly advantageous is an embodiment in which the impact wall of the impactor separator is formed by a region or section of the filter body of the first separator unit. For example, a flow directing element of the impactor separator directs the blow-by gas flow against a section of the filter body's surface on the clean side. The filter material is in particular suitable for absorbing oil mist particles. Hereby, a double function of the filter is provided.

In another advantageous embodiment it can be provided to form the flow directing element of the impact separator by a valve body of the bypass valve. For this, the valve body is formed in such a manner that, upon opening the bypass valve, it performs the flow directing function of the flow directing element. Hereby, the bypass valve is provided with a double function. Thereby, the oil mist separator can be implemented in a comparatively compact manner.

The flow of blow-by gas through the filter body results in that oil absorbed by the filter material forms droplets on the clean side of the filter material and flows off. To collect the oil that flows off, a housing of the oil mist separator contains a collection chamber for the oil and a return line by means of which the oil from the collection chamber can be conveyed out of the housing. According to a particularly advantageous embodiment, the return line runs from the collection chamber to a crude side of the filter body so that the oil can be conveyed out of the housing through this crude side. With this design, a return valve arranged on the clean side can be avoided, which return valve must be provided for a return line on the clean side to avoid a suction of blow-by gas while bypassing the oil mist separator or bypassing the separator unit. Typically, the return line runs back to the crankcase.

According to another, particularly advantageous embodiment, at least for the first separator unit, a filter cartridge can be provided which comprises two end disks and a ring-shaped filter body arranged therebetween. This filter cartridge is designed in such a manner that it can be arranged within the oil mist separator in a replaceable manner. Thus, in case of maintenance, the filter cartridge can be easily replaced with a new filter cartridge.

According to preferred developments, this filter cartridge can have not only components of the first separator unit, but also components of the second separator unit and/or of the bypass valve and/or of the return line, whereby the filter body has a high integration degree. At the same time, this embodiment results in that in case of maintenance, a comparatively high number of components of the oil mist separator can be replaced in one single work step.

The problem underlying the invention is hence also solved by means of a filter cartridge for an oil mist separator of the above mentioned type.

Further important features and advantages of the invention arise from the sub-claims, from the drawings and the associated description of the figures based on the drawings.

It is to be understood that the above mentioned features and the features yet to be illustrated hereinafter can be used not only in the respectively mentioned combination but also in any other combination or alone without departing from the scope of the present invention.

BRIEF DESCRIPTION OF THE DRAWING

Preferred exemplary embodiments are illustrated in the drawings and are explained in more detail in the following description, wherein identical reference numbers refer to identical or similar or functionally identical components.

In the figures.

DETAILED DESCRIPTION

Figure 1:
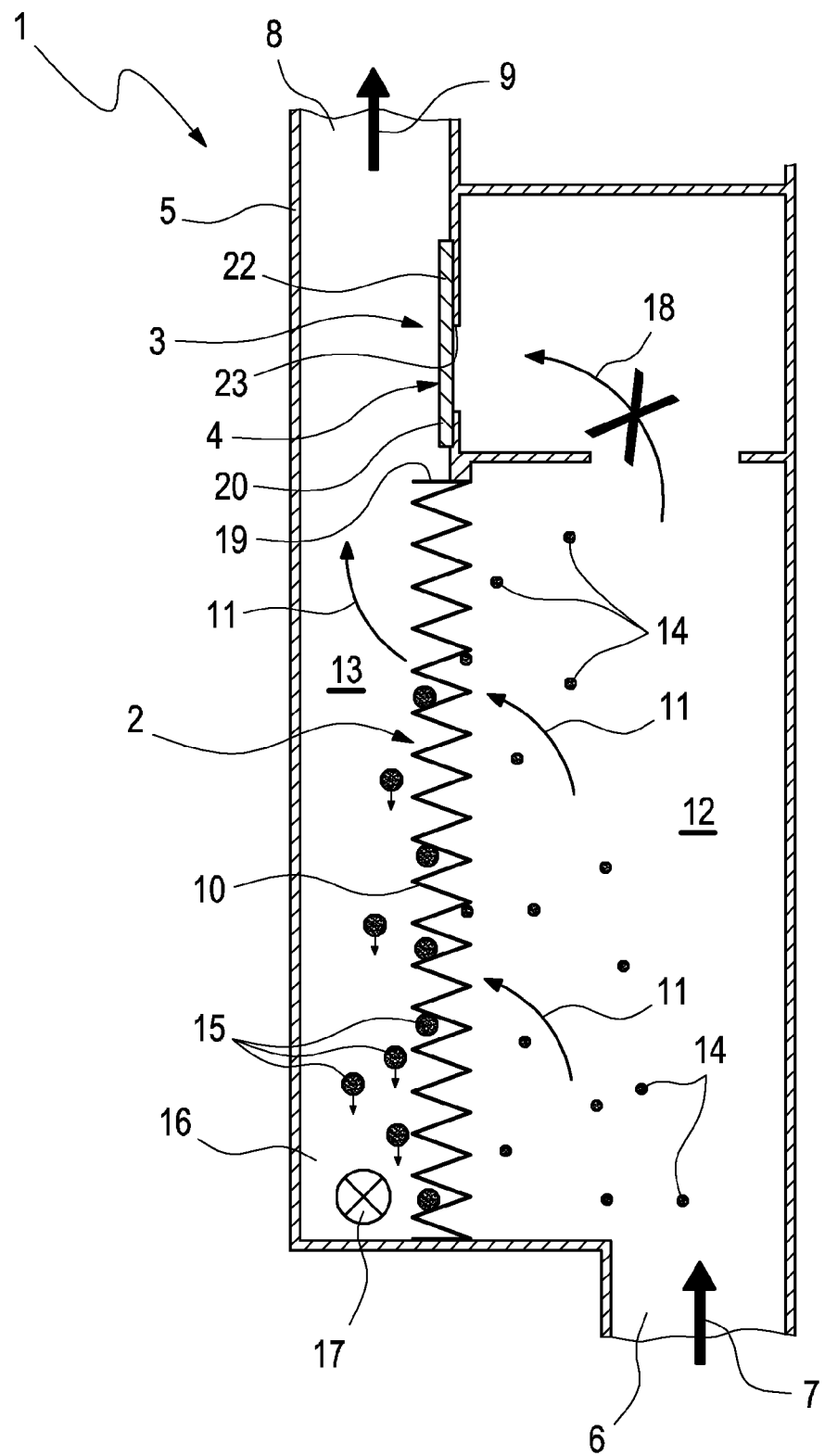
FIGS. 1 and 2 show schematically a greatly simplified longitudinal section through an oil mist separator in different operating states.

According to the FIGS. 1 to 6, an oil mist separator 1 comprises a first separator unit 2 and a second separator unit 3, and a bypass valve 4. The oil mist separator 1 is provided for a use in a positive crankcase ventilation system or forms an integral part of such a positive crankcase ventilation system. For this, the oil mist separator 1 is integrated in a vent line which connects a crankcase with a fresh gas tract of an internal combustion engine which can be arranged in particular in a motor vehicle. By means of the negative pressure prevailing within the intake tract, blow-by gas is exhausted from the crankcase. Oil mist and, if any, solid particles such as, e.g., soot carried along in the blow-by gas are separated from the blow-by gas by means of the oil mist separator 1. For this purpose, blow-by gas flows through the oil mist separator 1. A housing 5 of the oil mist separator 1 has an inlet 6 through which blow-by gas flows in according to arrow 7, and an outlet 8, through which blow-by gas flows out according to arrow 9.

The first separator unit 2 has at least one filter body 10 which consists of a filter material that is permeable for blow-by gas. For example, the filter body 10 consists of a fleece. Within housing 5, a blow-by gas path 11 is formed which runs from inlet 6 to outlet 8 and which is indicated here by flow arrows. Within the oil mist separator 1 or within the first separator unit 2, the filter body 10 separates a crude chamber 12 or a crude side 12 from a clean chamber 13 or a clean side 13. On the crude side, the blow-by gas carries oil particles 14. The same are to be separated from the blow-by gas by means of the first separator unit 2. For this, the filter body 10 is inserted into the blow-by gas path 11 in such a manner that blow-by gas can flow through the filter body. Thus, if the blow-by gas wants to follow the blow-by gas path 11, it has to flow through the filter body 10. The oil mist particles 14 accumulate on the filter body 10. The orientation of the blow-by gas flow has now the effect that the oil absorbed in the material of the filter body 10 accumulates on the clean side 13 to form droplets 15. Once these droplets 15 have reached a sufficient size, they can flow off or drip off the filter body 10. The direction of movement of the free droplets 15 is indicated here by arrows and is defined by the direction of gravity. On the clean side 13, the housing 5 contains a collection chamber 16 in which the oil separated by means of the separator units 2, 3 can accumulate. A return line 17 allows then that the oil can discharge from the collection chamber 16. The second separator unit 3 is arranged within a bypass path 18 which is symbolized here by an arrow and which bypasses the first separator unit 2. The bypass valve 4 controls the bypass path 18 at least for opening and closing. The bypass valve 4 is designed in such a manner that it opens and closes the bypass path 18 depending on a differential pressure applied to the first separator unit 2. At a low differential pressure below a predefined value, the bypass valve 4 remains closed so that no blow-by gas flows through the blow-by gas path 18. This state is illustrated in FIG. 1.

As soon as the differential pressure at the first separator unit 2 exceeds the predefined value, thus is relatively high, the bypass valve 4 opens so that subsequently blow-by gas can flow through the bypass path 18. The differential pressure within the first separator unit 2 can increase, for example, in that the filter body 10 gradually clogs with increasing wetting with oil, whereby its through-flow resistance increases temporarily. Furthermore, the through-flow resistance of the filter body 10 increases also over time in that solid particles such as, e.g. soot, deposit in the filter material which, in contrast to deposits of liquid particles, is normally permanent. Thus, the filter body 10 gradually clogs over the service life of the oil mist separator 1. Further, the differential pressure can also increase in that on the part of the positive crankcase ventilation system, a comparatively high blow-by gas amount has to be exhausted from the crankcase, for which reason a relatively high differential pressure is applied to the vent line, which differential pressure spreads to the oil mist separator 1 and is ultimately also applied to the first separator unit 2. To be able to implement a sufficient discharge of blow-by gas from the crankcase also at the predefined value of the differential pressure and at higher differential pressures, the bypass valve 4 opens as soon as this value is reached.

In the embodiments of FIGS. 1 to 6, the second separator unit 3 is designed as an impactor separator. For this, the second separator unit 3 has an impact wall 19 and a flow directing element 20. The flow directing element 20 serves for directing the blow-by gas flow against the impact wall 19 when the bypass path 18 is open. The gas flow impinges on said impact wall 19 and is deflected into the direction leading out of the housing 5. The particles which are carried along impinge against impact wall 19 as well, but stick thereto, can accumulate, form drops, and can flow off. To enhance the oil-absorbing effect of the impact wall 19, the same can have a fleece body or can be formed by a fleece body.

Figure 2:
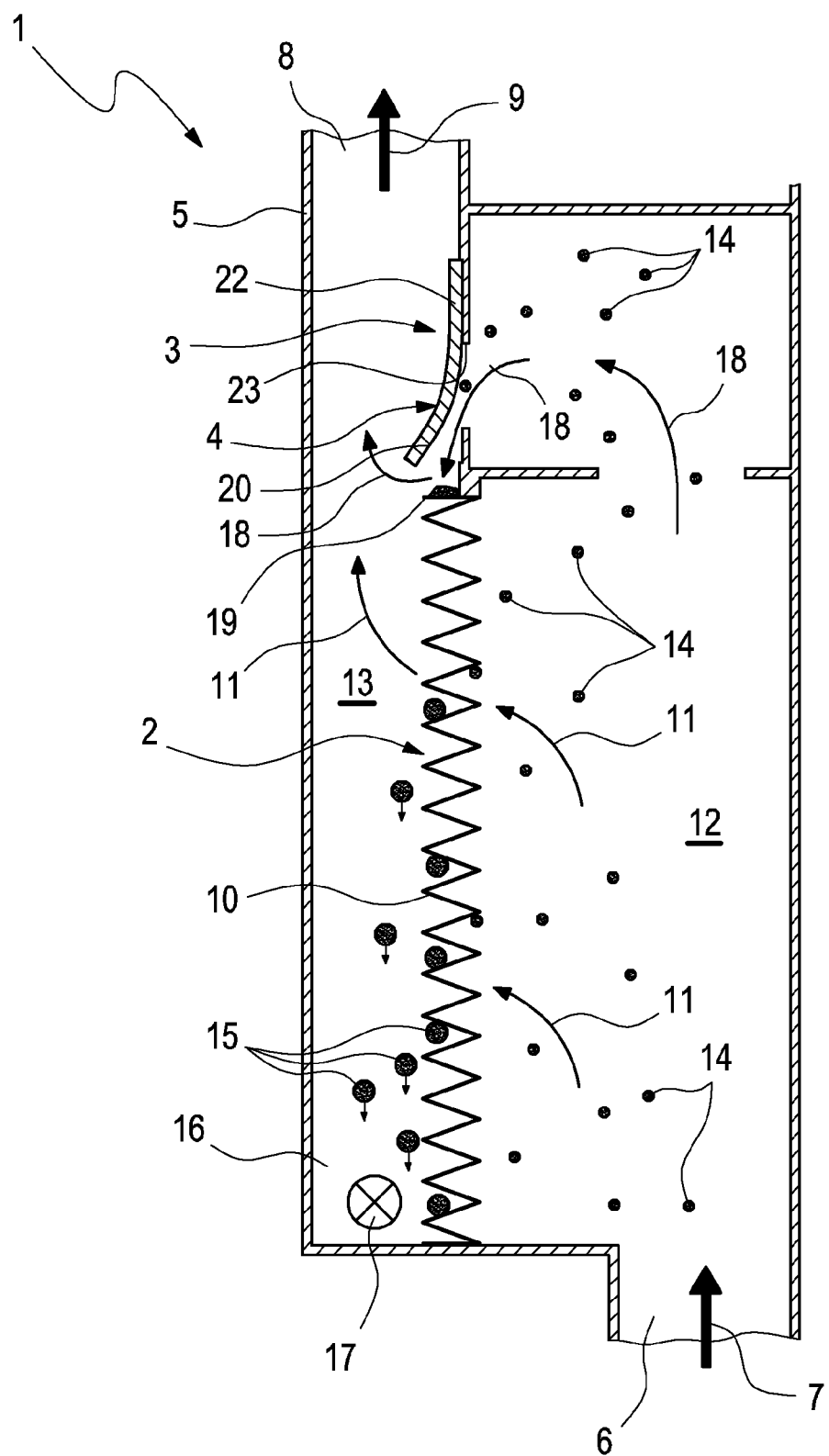

In the embodiment shown in the FIGS. 1 and 2, the impact wall 19 is formed by a section of the filter body 10 of the first separator unit 2. Purely exemplary, the impact wall 19 is formed here by an end fold of the filter body 10 which consists of folded filter material. Such filter material, which advantageously can involve a fleece, is particularly suitable for implementing such an impact wall 19. Said section of the filter body 10 which forms the impact wall 19 here, is arranged on the clean side 13. Accordingly, the oil separated by means of the second separator unit 3 drips off on the clean side and can be collected in the collection chamber 16 and can discharge through the return line 17.

In the embodiments of FIGS. 3 to 6, the impact wall 19 is a separate component with respect to the filter body 10 of the first separator unit 2. In the embodiment shown in the FIGS. 3, 5 and 6, the impact wall 19 is equipped with a separate fleece body 21 which is exposed to the blow-by gas flow directed by means of the flow directing element 20. In the embodiment shown in FIG. 4, the entire impact wall 19 is formed by a fleece body.

At least in the embodiments of FIGS. 1 to 6, the bypass valve 4 has a valve body 22 which is preloaded in its closed position by means of spring force and is exposed to the differential pressure applied to the first separator unit 2. Accordingly, said differential pressure actuates the valve body 22. The valve body 22 interacts with a bypass opening 23 to open and close or to control the same. In the examples of FIGS. 1 to 6, the valve body 22 is designed as a leaf spring. Other embodiments such as, for example, a flap which is spring-loaded in closing direction, are also conceivable.

Particularly advantageous are the embodiments shown here in which the flow directing element 20 of the impactor separator or the second separator unit 3 is formed by the valve body 22 of the bypass valve 4. In the embodiments shown here, the valve body 22 is designed in such a manner that, upon opening the bypass opening 23, it performs the flow directing function of the flow directing element 20 and thus directs the blow-by gas flow against the impact wall 19 when the blow-by gas path 18 is open. Here, the valve body 22 opens the bypass opening 23 specifically in such a manner that the developing blow-by gas flow impinges against the impact wall 19.

As already explained above, the return line 17 conveys the oil accumulating in the collection chamber 16 out of the housing 5. According to FIG. 3, said return line 17 can remain on the clean side 13 of the filter body 10. In this case, a return valve 24, which is symbolically indicated here, is to be arranged in the return line 24 to avoid the suction of a gas flow while bypassing the separator units 2, 3.

Figure 5:
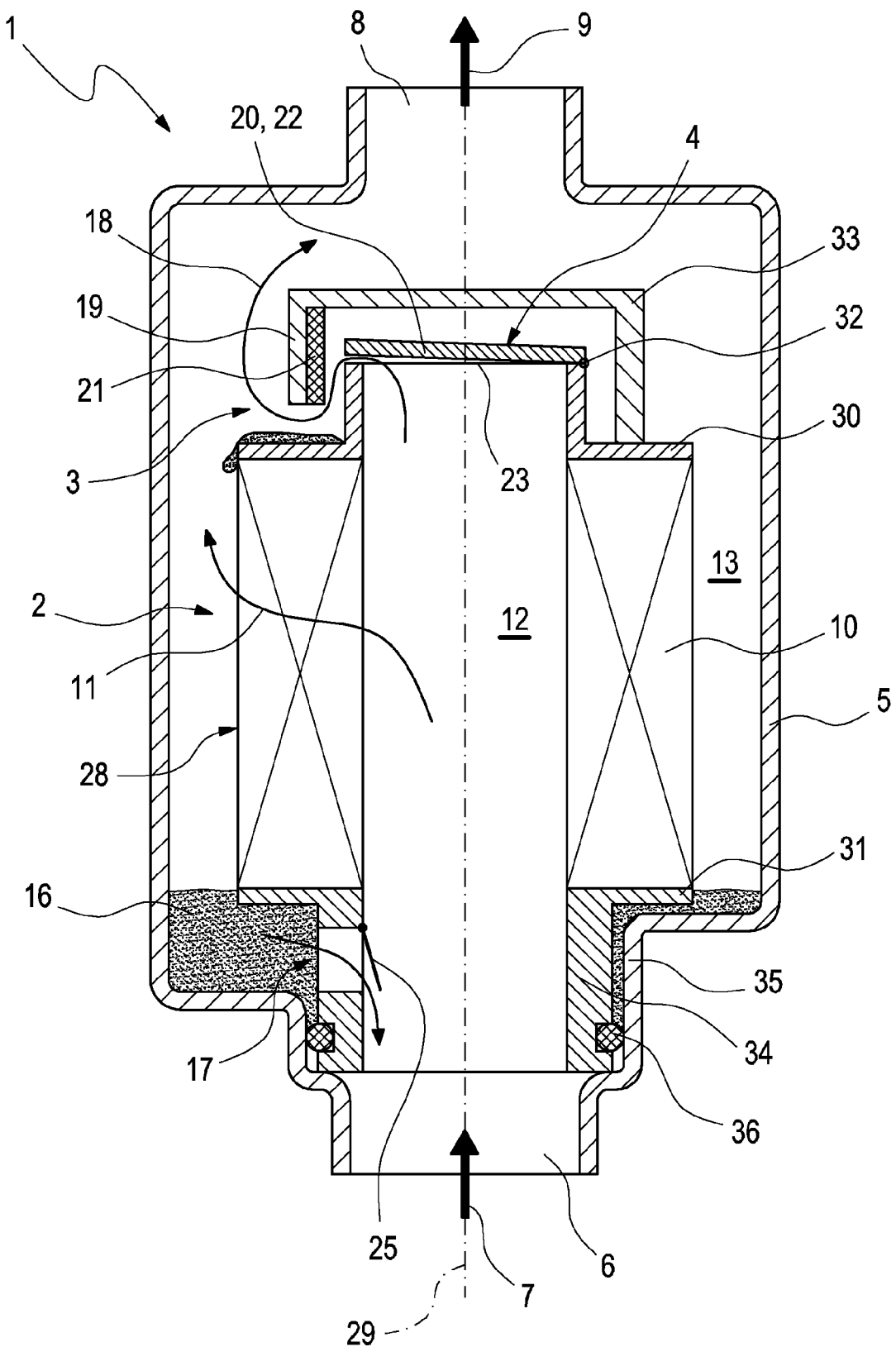
Figure 6:
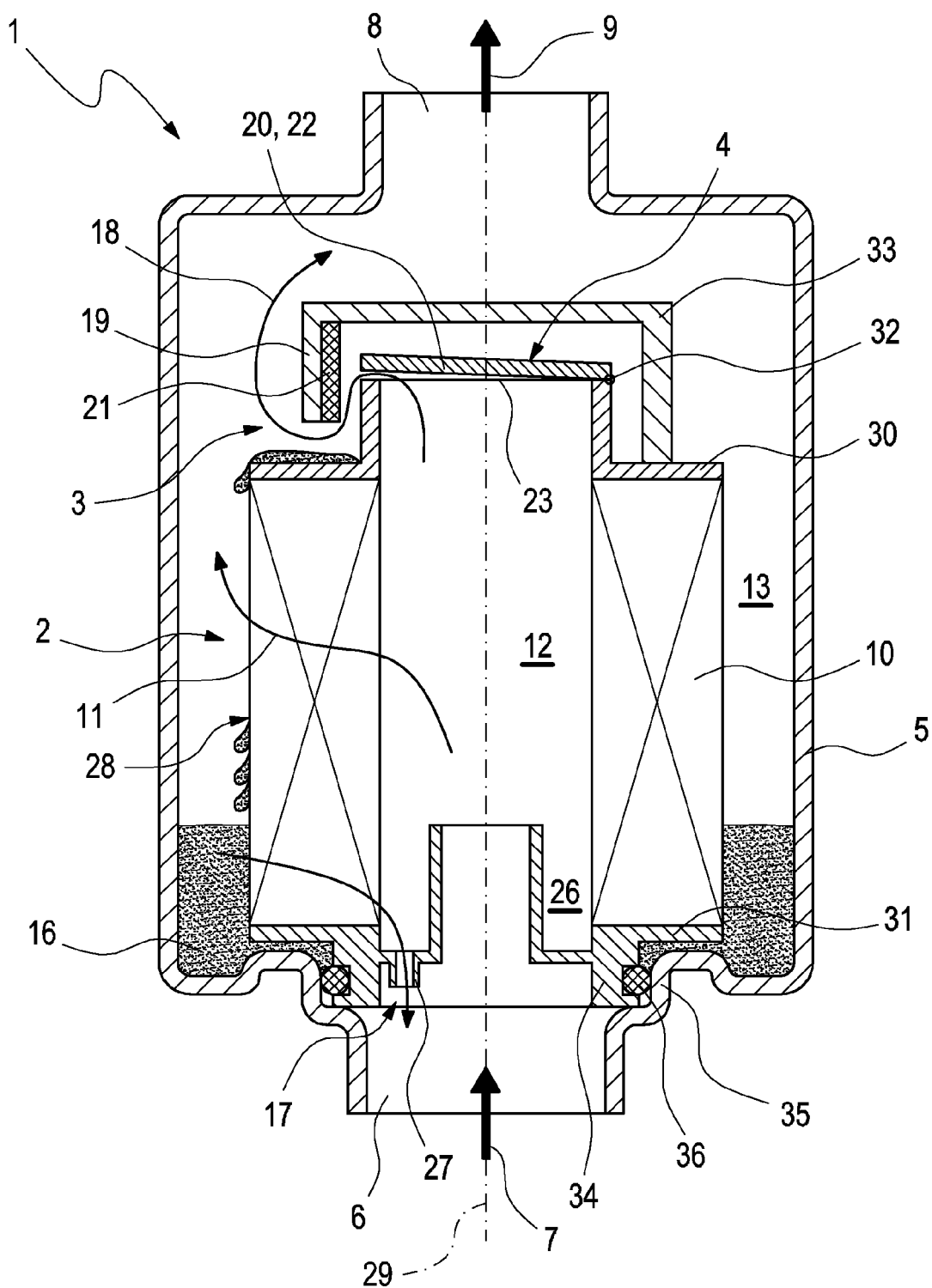

FIGS. 5 and 6 show a preferred embodiment in which the return line 17 runs from the collection chamber 16 to the crude side 12 of the filter body 10. Subsequently, the return line 17 can convey the oil out of the housing 5 through said crude side 12. The return line 17 typically runs back to the crankcase anyway. Since the crude side 12 of the filter body 10 communicates with the inlet 6 of the housing 5, with a suitable laying of the line, the oil gets automatically back again from the crude side 12 into the crankcase. Thus, an external return line is not required.

In the embodiment shown in FIG. 5, the return line 17 has a return valve 25. This return valve 25 is designed in such a manner that it allows the oil to flow from the collection chamber 16 to the crude side 12 while it prevents suction of blow-by gas from the crude side 12.

The collection chamber 16 which is arranged on the clean side 13 of the filter body 10 is at least partially bordered by the filter body 10 of the embodiment shown in FIG. 6. Here, the return flow 17 runs through the filter body 10. The blow-by gas flow drives the accumulating oil to the clean side 13 thereby causing the formation of larger drops which, due to gravity, can discharge downwards along the filter material or along the filter body 10. Within the collection chamber 16, the oil rises along the filter body 10, whereby a dynamic pressure in a lower region of the filter body 10 increases accordingly.

The oil level within the collection chamber 16 obstructs at the same time the flow of blow-by gas through this lower region of the filter body 10. Hereby, oil can be pushed through the filter material so that it flows through the filter body 10 in opposite direction of the blow-by gas flow and thus reaches the crude side 12. In this embodiment, a return valve 25, which is still needed in the embodiment shown in FIG. 5, can be omitted.

FIG. 6 shows a further peculiarity in which the return line 17 has a collecting channel 26 on the crude side 12 of the filter body 10. In this collecting channel 26, the oil getting to the crude side 12 through the return line 17 can be collected. This collecting channel 26 is equipped with at least one drain 27 which is designed here as a discharge nozzle. Through this drain 27, the oil can discharge again from the collecting channel 26. For example, the oil drips through the drain 27 and hence through the inlet 6 out of the housing 5. In the embodiment shown in FIG. 6, said collecting channel 26 is combined with the variant in which the return line 17 runs through the filter body 10. It is obvious that the collecting channel 26, for example, can also be combined with the variant shown in FIG. 5 in which the return line 17 comprises the return valve 25.

According to FIGS. 1 and 2, the filter body 10 of the first separator unit 2 can be designed as a plate filter type. The filter body 10 can be fixedly mounted in the oil mist separator 1. Also, the filter body 10 can be replaceably arranged in the oil moist separator 1.

In contrast to FIGS. 1 and 2, the FIGS. 3 to 6 show an embodiment in which the first separator unit 2 has a filter cartridge 28 which is replaceably arranged in the oil mist separator 1 or in the housing 5 of the same. Said filter cartridge 28 comprises the filter body 10 which is ring-shaped in this case. A longitudinal center axis of the filter cartridge 28 is designated here with 29. With respect to this longitudinal center axis 29, the filter cartridge 28 comprises two axial end disks 30 and 31 which hereinafter, according to their mounting position according to the FIGS. 3 to 6, can also be designated as upper end disk 30 and lower end disk 31. The filter body 10 is arranged axially between these two end disks 30, 31. Suitably, the filter body 10 is welded or glued to the end disks 30, 31 or is plasticized therein. By means of the replaceable filter cartridge 28, an easy possibility is provided to replace the filter cartridge 28 within a maintenance interval, whereby at least the filter body 10 can be renewed.

According to the embodiments shown here, additional components and/or functionalities of the oil mist separator 1 can be integrated in the filter cartridge 28. The following itemization is purely exemplary, in particular, the mentioned features can be implemented additionally or alternatively on the filter cartridge 28. In the embodiments shown here, the bypass valve 4, for example, is formed on the filter cartridge 28. In the examples of FIGS. 3 to 6, the bypass valve 4 involves substantially the valve body 22 designed as a leaf spring. Also, the valve body 22 can be a plate-shaped component which is pivotable at 32 about a pivot axis and which, for example, is preloaded in its closed position by means of a leg spring which is not illustrated here. Moreover, in these embodiments, the bypass path 18 for bypassing the filter body 10 is integrated in the filter cartridge 28. Here, the bypass valve 4 is formed at the upper end disk 30 and interacts with a central opening, namely the bypass opening 23 which is also formed in the upper end disk 30. The bypass path 18 runs through said bypass opening 23, thus through the upper end disk 30. In the embodiments of the FIGS. 3, 5, and 6, the impact wall 19 is attached to the upper end disk 30 by means of a bracket 33. In this manner, also the impact wall 19 is integrally formed on the filter cartridge 28. Since here too the flow directing element 20 and the valve body 22 are formed by a common component, the whole impactor separator or the whole second separator unit 3 is formed on the filter cartridge 28.

Figure 3:
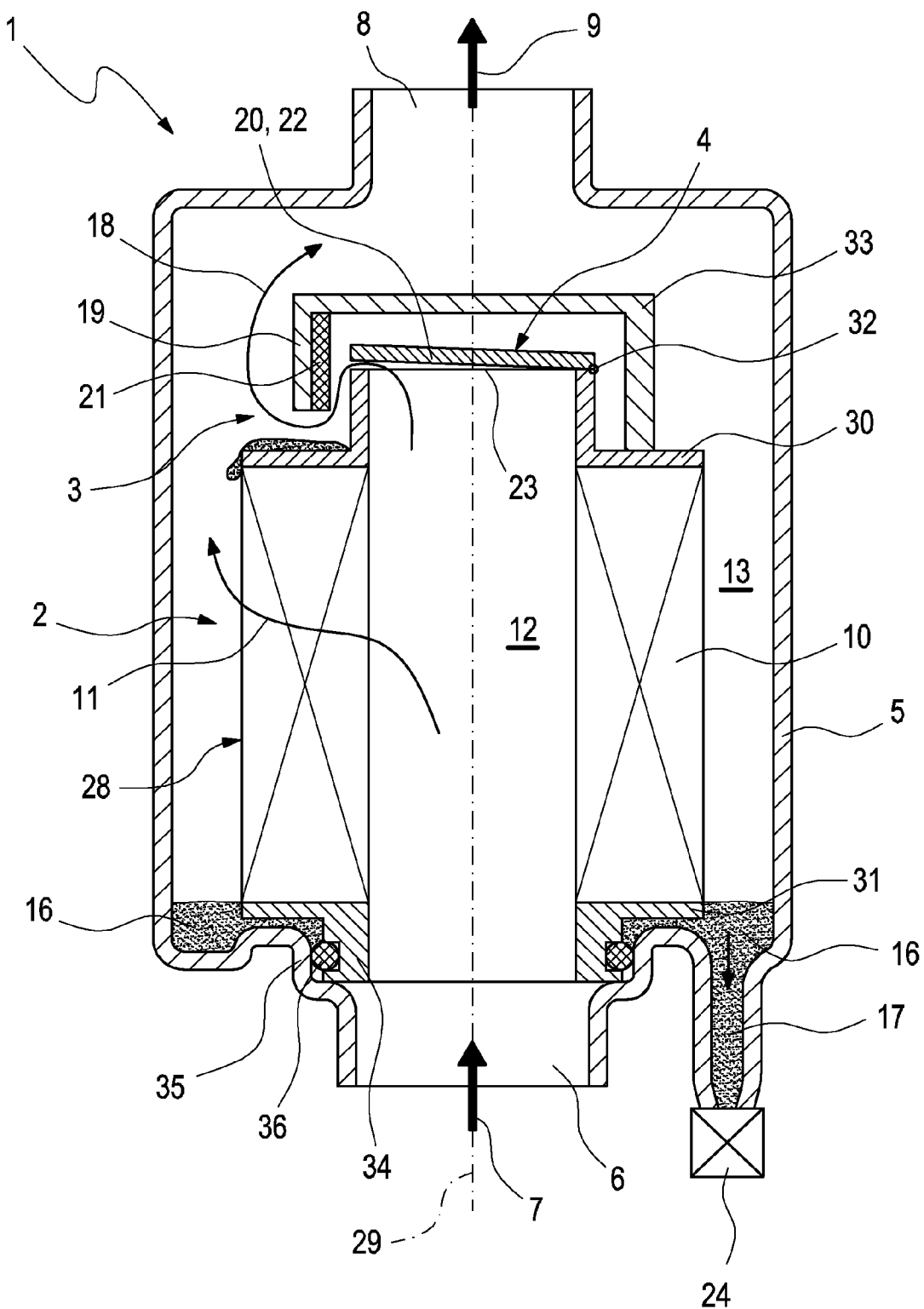
FIGS. 3 to 6 show schematically a greatly simplified longitudinal section through an oil mist separator in different other embodiments.
Figure 4:
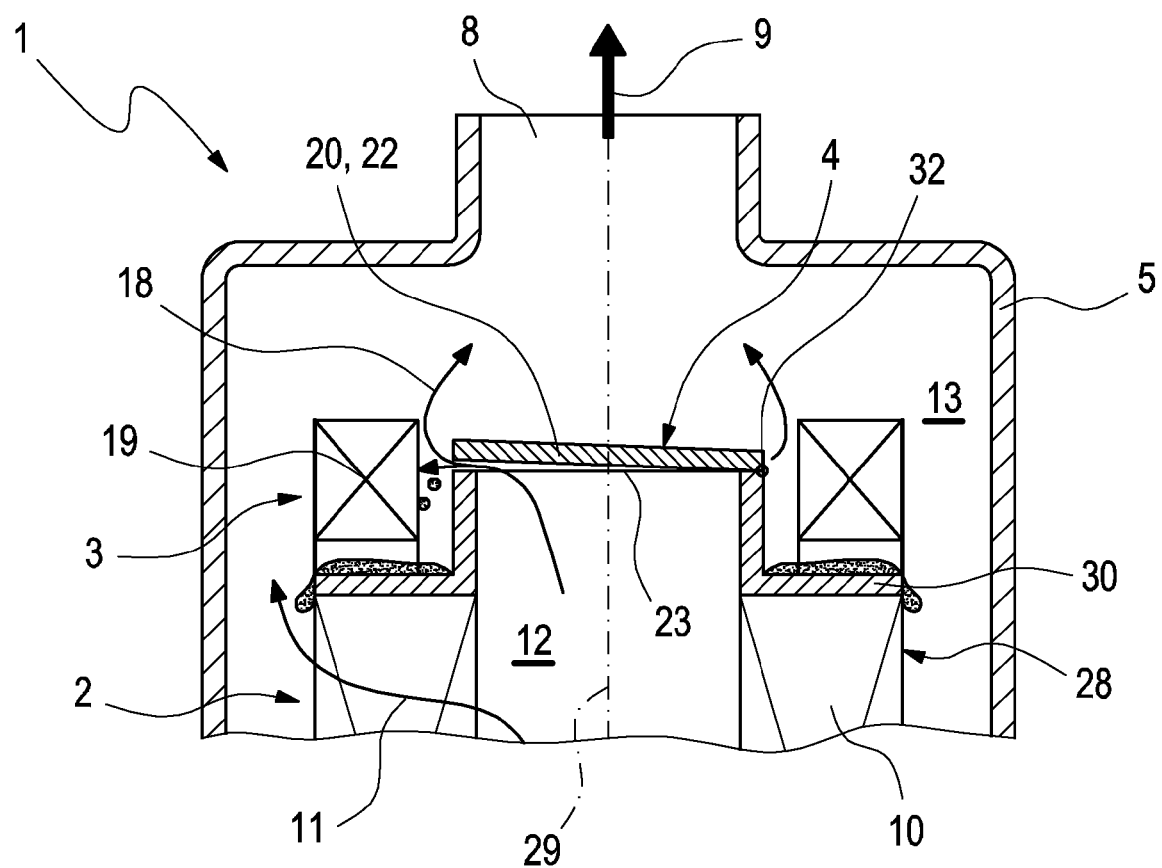

According to the FIGS. 3, 5, and 6, at the lower end disk 31, a socket 34 is formed with which the filter cartridge 28 is inserted in a corresponding socket receptacle 35 formed within the housing 5. For this, on the socket 34, a seal 36 can be arranged. In the embodiment shown in FIG. 5, the return valve 25 is formed on this socket 34. The socket 34 serves here for bordering the collection chamber 16 and contains the return valve 25 so that the return line 17 runs through the socket 34. In the embodiment shown in FIG. 6, the collecting channel 26 is formed at the filter cartridge 28. For example, the collecting channel 26 is attached on the lower end disk 31.

Figure 7:
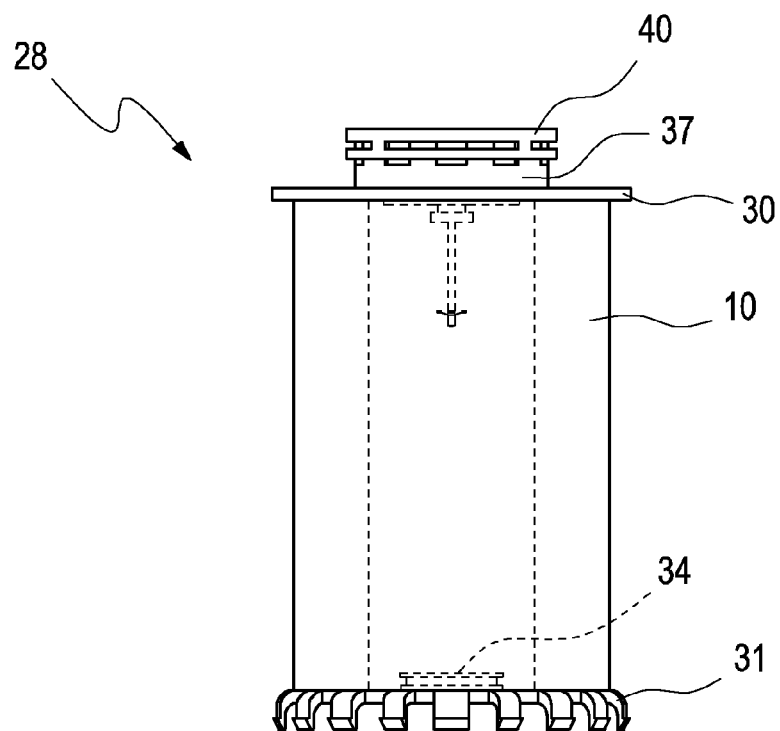
FIG. 7 shows schematically a side view of a filter cartridge.
Figure 8:
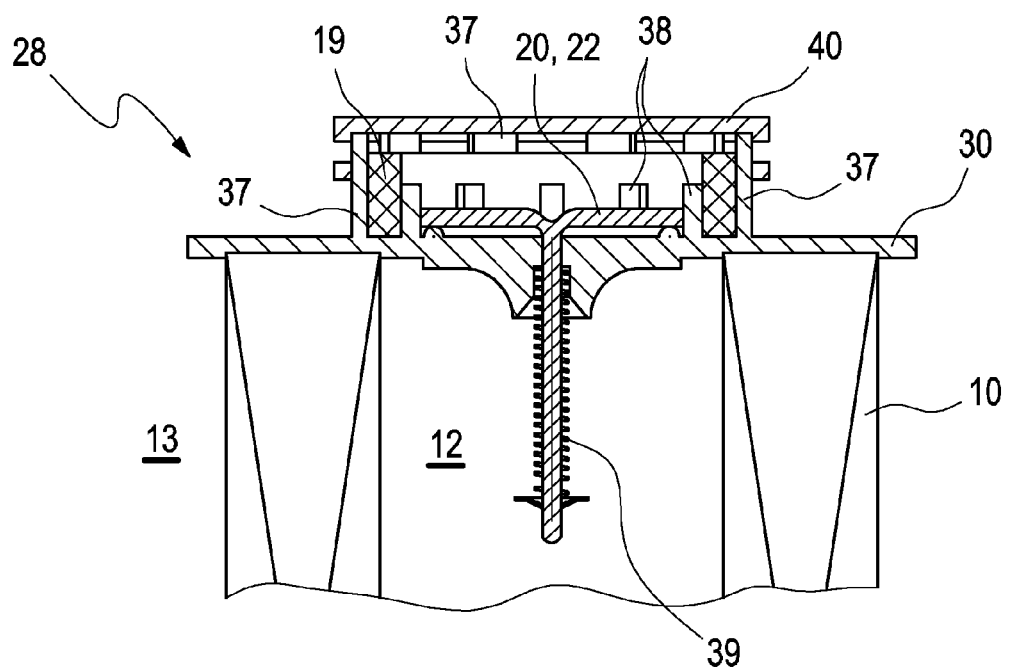
FIG. 8 shows schematically a longitudinal section through a filter cartridge in the region of a bypass valve.

FIGS. 7 and 8 show further embodiments for the filter cartridge 28. Here too, the impact wall 19 is formed by a fleece body which is radially supported on the outside by a ring 37 or by ribs 37 which extends or extend from the upper end disk 30. Radially inwards, the fleece body forming the impact wall 19 is supported by further ribs 38 which also extend from the upper disk 30. Here, the valve body 22 has a plate-shaped design and is preloaded in its illustrated closed position with a return spring 39. The inner ribs 38 form at the same time an outer guide for the valve body 20. Hereby, the valve body 20 can carry out a guided axially stroke. As soon as the valve body 22 lifts at an appropriate differential pressure from its seat, it serves at the same time as flow directing element 20 of the second separator unit 3 which is designed as an impactor separator. Moreover, in the example, a cover 40 is provided which is clipped onto the outer ribs 37 and which implements an axial locking of the impact plate 19 which is formed by the fleece body. Here, the impact plate 19 is ring-shaped.

Figure 9:
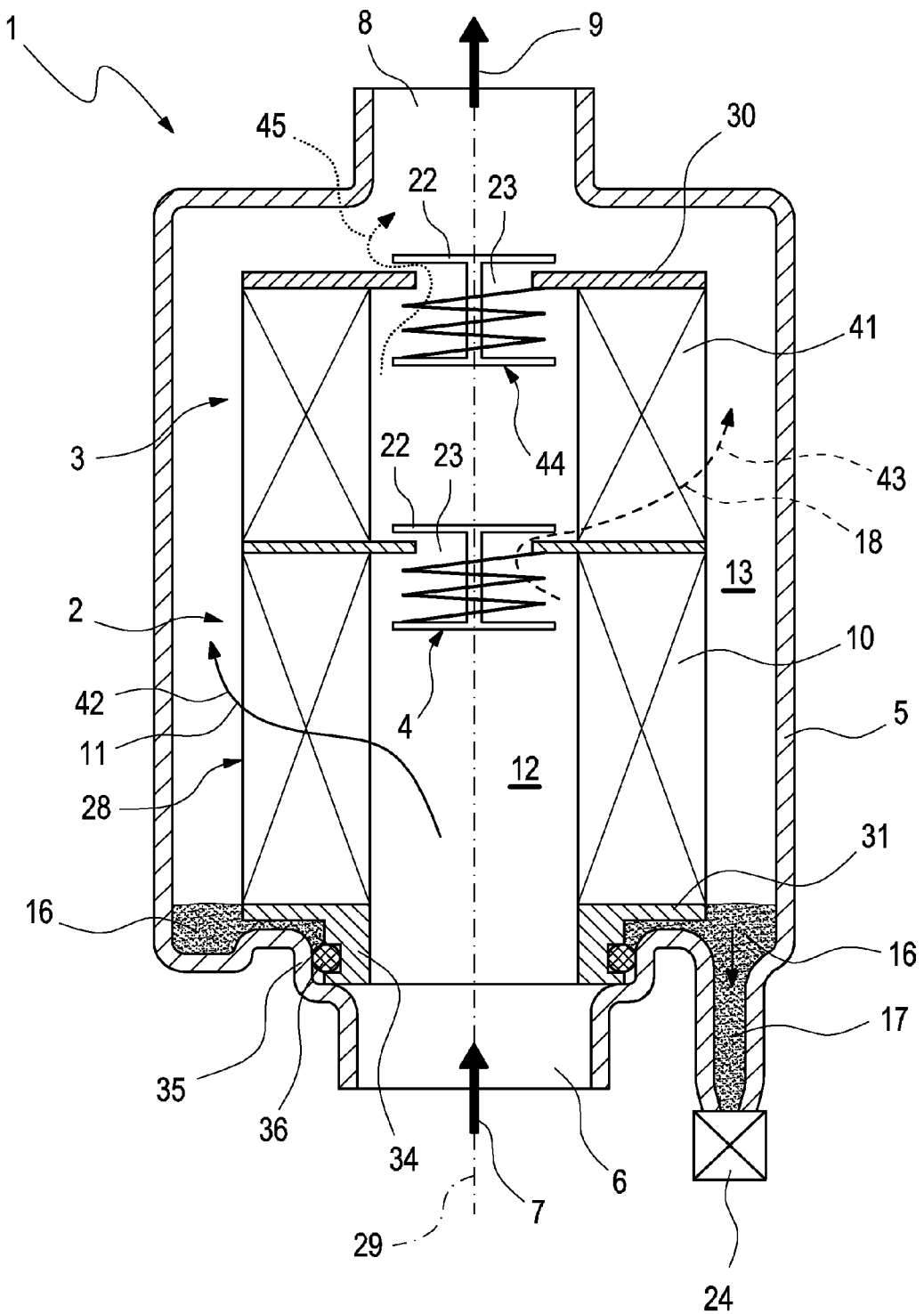
FIG. 9 shows schematically a greatly simplified longitudinal section through an oil mist separator in a further embodiment.

According to FIG. 9, in another embodiment of the oil mist separator 1, the second separator unit 3 can also have at least one filter body 41 which is arranged within the bypass path 18 in such a manner that blow-by gas can flow through it. Principally, the further filter body 41 can be made of the same filter material as the filter body 10 of the first separator unit 2. Within the housing 5, the normal blow-by gas flow, which exists at closed bypass valve 4 and which flows through the first separator unit 2, is illustrated in FIG. 5 by an arrow 44 with a solid line. The blow-by gas flow with bypass valve 4 open is illustrated by an arrow 43 with a broken line. In this case, the blow-by gas flows additionally or alternatively through the filter body 41 of the second separator unit 3. FIG. 9 shows a particular embodiment in which a further bypass for bypassing the second separator unit 3 is provided, which bypass is also controlled by means of a further bypass valve 44 depending on the differential pressure at the second separator unit 3. A blow-by gas flow through said further bypass when the further bypass valve 44 is open is illustrated in FIG. 9 by an arrow 45 with a dotted line. Principally, in this manner, any number of separator units 2, 3 can be arranged next to one another in a cascading manner. In particular conceivable is here a modular design of the filter cartridge 28, wherein depending on the requirements, two or more separator units 2, 3 are assembled.

In the embodiment shown in FIG. 9, each of the respective bypass valves 4 or 44 is equipped again with a spring-loaded valve member 22. Alternatively, other embodiments for the valve body 22 are also conceivable. For example, the same can also be designed as a disk spring.

The invention claimed is:

1. A positive crankcase ventilation oil mist separator system comprising:
a first separator unit, wherein the first separator unit includes at least one filter body arranged in a blow-by gas path such that blow-by gas flows through the filter body;
a second separator unit, wherein the second separator is an impactor separator arranged in a bypass path that bypasses the first separator unit;
a bypass valve, which opens the bypass path as soon as a differential pressure at the first separator unit exceeds a predefined value, wherein the second separator unit comprises an impact wall formed by a section of the filter body of the first separator unit, and a flow directing element, which directs the blow-by gas flow against the impact wall when the blow-by gas path is open;
wherein the second separator unit is arranged parallelly to the first separator unit and downstream of the bypass valve.

2. The oil mist separator according to claim 1, wherein the impact wall has a fleece body.

3. The oil mist separator according to claim 1 wherein the flow directing element is formed by a valve body of the bypass valve.

4. The oil mist separator according to claim 1 wherein the bypass valve has a valve body, which is at least one of a leaf spring, a disk spring and a spring-loaded valve member.

5. The oil mist separator according to claim 1, wherein a collection chamber is formed on a clean side of the filter body in a housing of the oil mist separator of the first separator unit, wherein oil accumulates and is separated from the blow-by gas with at least one of the first separator unit and the second separator unit.

6. The oil mist separator according to claim 5, wherein a return line conveys the oil accumulated in the collection chamber out of the housing.

7. The oil mist separator according to claim 6, wherein the return line fluidly connects the collection chamber to a crude side of the filter body of the first separator unit to convey the oil out of the housing through said crude side.

8. The oil mist separator according to claim 6, wherein the return line has a return valve which allows a discharge of oil to the crude side and prevents suction of blow-by gas from the crude side.

9. The oil mist separator according to claim 6 wherein the collection chamber is at least partially bordered by the filter body of the first separator unit so that the return line runs through the filter body.

10. The oil mist separator according to claim 5 wherein on the crude side, the return line has a collecting channel for oil, wherein the channel has at least one drain through which the oil exits the collecting channel.

11. The oil mist separator according to claim 1 wherein the first separator unit includes a filter cartridge having a ring-shaped filter body between two end disks, wherein the filter cartridge is replaceably arranged in the oil mist separator.

12. The oil mist separator according to claim 11, wherein at least one of the second separator unit, the bypass path, the bypass valve, a filter body of the second separator unit, the impactor separator, the impact wall, the flow directing element, the fleece body, the valve body, the leaf spring, the disk spring, the spring-loaded valve member, at least a part of the return line, the return valve and the collecting channel is formed at the filter cartridge.

13. An oil mist separator filter cartridge, comprising: a ring-shaped filter body between two end disks, wherein the filter cartridge is replaceably arranged in at least one oil mist separator, and wherein at least one of a second separator unit, a bypass path, a bypass valve, a filter body of the second separator unit, an impactor separator, an impact wall, a flow directing element, a fleece body, a valve body, a leaf spring, a disk spring, a spring-loaded valve member, at least a part of a return line, a return valve and a collecting channel is formed at the filter cartridge, wherein the second separator unit is arranged parallelly to a first separator unit and downstream of the bypass valve.

14. The oil mist separator according to claim 2, wherein the flow directing element is formed by a valve body of the bypass valve.

15. The oil mist separator according to claim 2, wherein the bypass valve has a valve body, which is at least one of a leaf spring, a disk spring and a spring-loaded valve member.

16. The oil mist separator according to claim 3, wherein the bypass valve has a valve body, which is at least one of a leaf spring, a disk spring and a spring-loaded valve member.

17. The oil mist separator according to claim 2, wherein a collection chamber is formed on a clean side of the filter body in a housing of the oil mist separator of the first separator unit, wherein oil accumulates and is separated from the blow-by gas with at least one of the first separator unit and the second separator unit.

18. The oil mist separator according to claim 3, wherein a collection chamber is formed on a clean side of the filter body in a housing of the oil mist separator of the first separator unit, wherein oil accumulates and is separated from the blow-by gas with at least one of the first separator unit and the second separator unit.

19. The oil mist separator according to claim 4, wherein a collection chamber is formed on a clean side of the filter body in a housing of the oil mist separator of the first separator unit, wherein oil accumulates and is separated from the blow-by gas with at least one of the first separator unit and the second separator unit.

20. The oil mist separator according to claim 7, wherein the return line has a return valve which allows a discharge of oil to the crude side and prevents suction of blow-by gas from the crude side.

* * * * *